(12) United States Patent
Torres et al.

(10) Patent No.: US 8,982,517 B2
(45) Date of Patent: Mar. 17, 2015

(54) ELECTROSTATIC DISCHARGE PROTECTION APPARATUS

(71) Applicant: Texas Instruments Incorporated, Dallas, TX (US)

(72) Inventors: Cynthia Ann Torres, Austin, TX (US); Timothy Alan Rost, Plano, TX (US); Senthil Kumar Sundaramoorthy, Bangalore (IN); Victor James Nuss, Crandall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 143 days.

(21) Appl. No.: 13/756,243

(22) Filed: Jan. 31, 2013

(65) Prior Publication Data

US 2013/0201586 A1    Aug. 8, 2013

Related U.S. Application Data

(60) Provisional application No. 61/594,124, filed on Feb. 2, 2012.

(51) Int. Cl.
*H02H 9/04* (2006.01)

(52) U.S. Cl.
CPC .................................. *H02H 9/046* (2013.01)
USPC .......................................................... 361/56

(58) Field of Classification Search
CPC . H02H 9/046; H01L 27/0296; H01L 27/0292
USPC .......................................................... 361/56
See application file for complete search history.

(56) References Cited

U.S. PATENT DOCUMENTS

| | | | | |
|---|---|---|---|---|
| 6,385,021 | B1 * | 5/2002 | Takeda et al. | 361/56 |
| 8,064,177 | B2 * | 11/2011 | Gajanana et al. | 361/56 |
| 8,493,698 | B2 * | 7/2013 | Morishita | 361/56 |
| 2004/0027742 | A1 * | 2/2004 | Miller et al. | 361/52 |
| 2008/0247104 | A1 * | 10/2008 | Kwak | 361/56 |
| 2011/0267723 | A1 * | 11/2011 | Stockinger et al. | 361/56 |

* cited by examiner

*Primary Examiner* — Scott Bauer
(74) *Attorney, Agent, or Firm* — John R. Pessetto; Frank D. Cimino

(57) ABSTRACT

An electrostatic discharge (ESD)-triggered protection apparatus includes a first circuit and a second circuit. The first circuit includes an ESD trigger circuit to sense an ESD pulse and to generate a switching pulse responsive to the ESD pulse; a first ESD discharge device communicatively coupled to the ESD trigger circuit and responsive to the switching pulse to transfer a current generated by the ESD pulse to the ground rail; a control circuit that generates a control signal in response to the switching pulse. The second circuit includes at least one trigger cell buffer that is configured to receive the control signal and to control a second ESD discharge device such that the current generated by the ESD pulse is transferred to the ground rail.

16 Claims, 3 Drawing Sheets

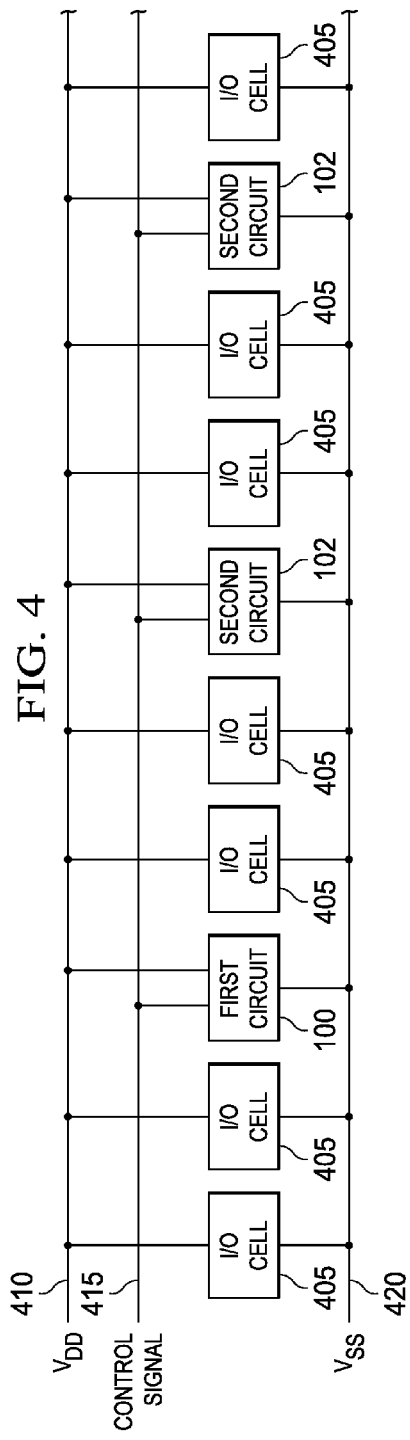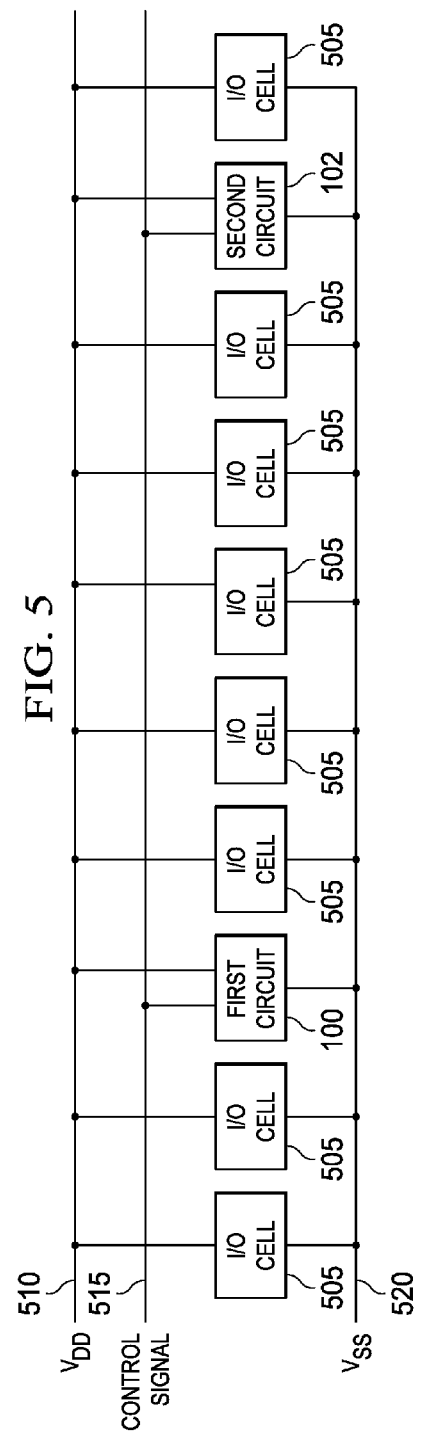

ELECTROSTATIC DISCHARGE PROTECTION APPARATUS

CROSS REFERENCE TO RELATED APPLICATIONS

This application claims the benefit of provisional patent application No. 61/594,124, filed on Feb. 2, 2012, in the United States Patent And Trademarks Office, which is incorporated herein by reference in its entirety.

TECHNICAL FIELD

Embodiments of the disclosure relate to semiconductor integrated circuits, including apparatus to protect such circuits from electrostatic discharge (ESD).

BACKGROUND

Semiconductor integrated circuits utilizing high impedance transistor technologies such as metal oxide semiconductor (MOS) technologies are known to be vulnerable to ESD. ESD "events" may include the so-called "human body model" (HBM) type of event. See e.g., JEDEC Standard JS-001-2012, JOINT JEDEC/ESDA STANDARD FOR ELECTROSTATIC DISCHARGE SENSITIVITY TEST-HUMAN BODY MODEL (HBM)-COMPONENT LEVEL (2012) for additional information about HBM. A person may accumulate static electrical charge on the surface of his or her body, generally through the rubbing together of dissimilar articles of clothing, shoes rubbing against carpet, clothing rubbing against a car seat when entering or exiting a vehicle, etc., particularly at times of low relative humidity. An HBM ESD event occurs when the person subsequently touches a conductor, including perhaps an electronic circuit and discharges the accumulated charge to and through circuit components. Such components may be subject to damage by a resulting discharge pulse of 1000 volts or more with a discharge time of several hundred nanoseconds.

In an integrated circuit, different chip applications may require different levels of ESD protection for ensuring adequate reliability through the manufacturing process. ESD protection devices utilizing a metal oxide semiconductor field-effect transistor (MOSFET) as a discharge device between voltage rails are known. A MOSFET designed for such purpose typically includes a wide, short current channel that is able to conduct several amperes of current produced by a typical ESD event. The transistors (also known as clamps) are triggered with an ESD transient and shunt the ESD current between the power rails. The current handling capability of the MOSFET should be changed to handle the currents associated with different ESD levels. These MOSFETs can be sized to handle the expected ESD current. Less current allows the clamp width to be reduced. The general practice is to design a single ESD solution for the highest level of ESD protection required, but this means that applications with less stringent requirements have inefficient use of layout area. Thus, it is desirable to have an ESD protection apparatus that caters to varying levels of ESD protection.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides electrostatic discharge (ESD)-triggered protection apparatus having a first circuit and a second circuit. The first circuit includes an ESD trigger circuit to sense an ESD pulse and to generate a switching pulse responsive to the ESD pulse; a first ESD discharge device communicatively coupled to the ESD trigger circuit and responsive to the switching pulse to transfer a current generated by the ESD pulse to the ground rail; a control circuit that generates a control signal in response to the switching pulse. The second circuit includes at least one trigger cell buffer that is configured to receive the control signal and to control a second ESD discharge device such that the current generated by the ESD pulse is transferred to the ground rail.

Another embodiment provides ESD-triggered protection apparatus in an integrated circuit having a ring of input/output (I/O) cells, a first circuit, and at least one of a second circuit. The first circuit includes an ESD trigger circuit to sense an ESD pulse and to generate a switching pulse responsive to the ESD pulse; a first ESD discharge device communicatively coupled to the ESD trigger circuit and responsive to the switching pulse to transfer a current generated by the ESD pulse to the ground rail; and a control circuit that generates a control signal in response to the switching pulse. The second circuit includes at least one trigger cell buffer that is configured to receive the control signal and to control a second ESD discharge device such that the current generated by the ESD pulse is transferred to the ground rail. The first ESD discharge device and the second ESD discharge device includes a metal oxide semiconductor (MOS) power transistor having a current channel with a width sufficient to transfer the current generated by the ESD pulse to the ground rail. The current channel width of the first ESD discharge device is different from that of the second ESD discharge device.

An example embodiment provides electrostatic discharge (ESD)-triggered protection apparatus. The apparatus includes an ESD trigger circuit to sense an ESD pulse and to generate a switching pulse responsive to the ESD pulse; a first ESD discharge device communicatively coupled to the ESD trigger circuit and responsive to the switching pulse to transfer a current generated by the ESD pulse to the ground rail; at least one inverting buffer communicatively coupled between the ESD trigger circuit and the ESD discharge device to propagate the switching pulse from the ESD trigger circuit to the ESD discharge device; a control circuit that generates a control signal in response to the switching pulse; and a second ESD discharge device communicatively coupled to the control circuit and responsive to the control signal to transfer the current generated by the ESD pulse to the ground rail.

Other aspects and example embodiments are provided in the Drawings and the Detailed Description that follows.

BRIEF DESCRIPTION OF THE VIEWS OF DRAWINGS

FIG. 4 and FIG. 5 are block diagrams of an ESD-triggered protection apparatus for various levels of ESD protection according to various embodiments.

DETAILED DESCRIPTION OF THE EMBODIMENTS

Figure 1:
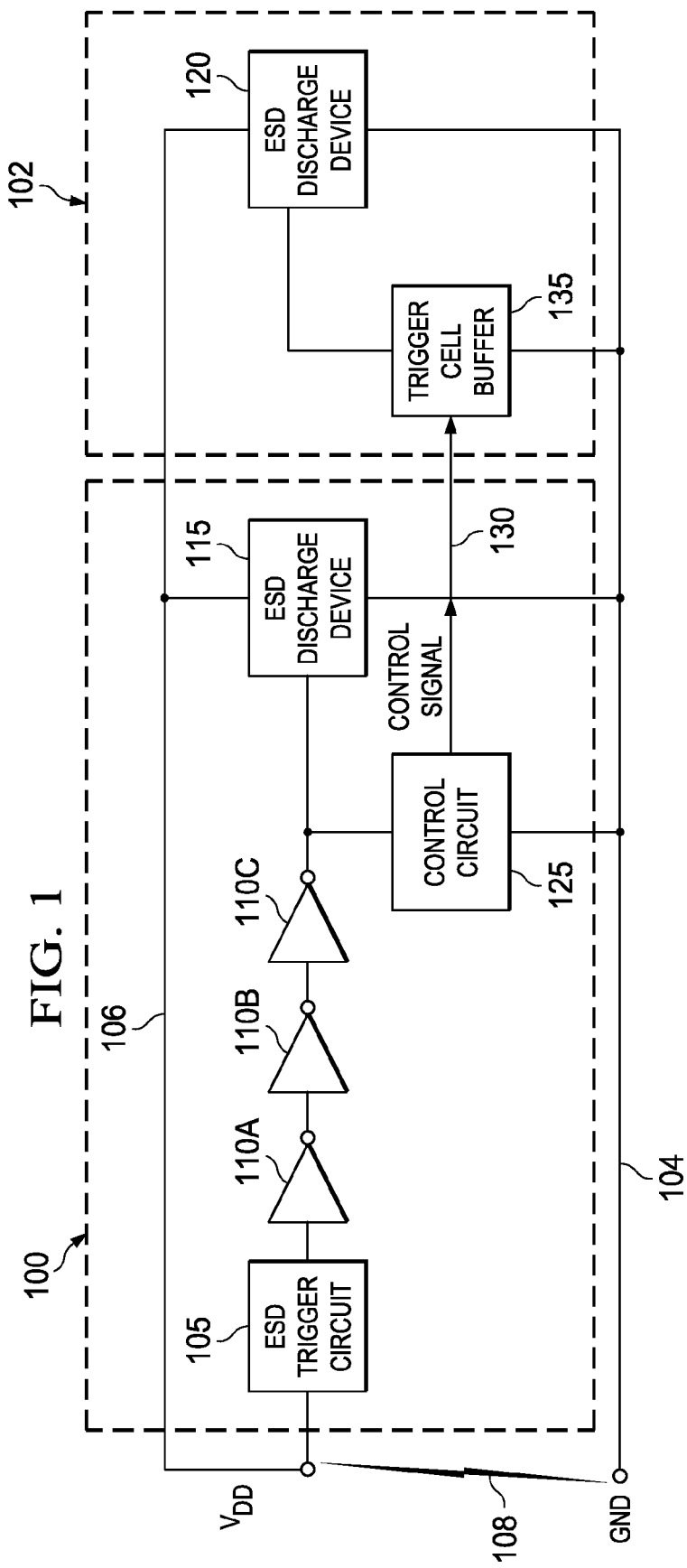
FIG. 1 is a block diagram of an ESD-triggered protection apparatus according to various embodiments.

FIG. 1 is a block diagram of an ESD-triggered protection apparatus according to various embodiments. The ESD-triggered protection apparatus includes a first circuit 100 and a second circuit 102. The first circuit includes an ESD trigger circuit 105. The ESD trigger circuit 105 senses an ESD pulse 108 and generates a switching pulse responsive to the ESD pulse 108. The switching pulse cascades through the protection apparatus as further described below. The first circuit 100 includes one or more inverting buffers 110A, 110B and 110C communicatively coupled between the ESD trigger circuit 105 and the ESD discharge device 115 (first ESD discharge device). The ESD discharge device 115 operates in response to the switching pulse to transfer a current generated by the ESD pulse 108 to a ground rail 104. The inverting buffers 110A, 110B and 110C propagate the switching pulse from the ESD trigger circuit 105 to the ESD discharge device 115.

The first circuit 100 further includes a control circuit 125 that is communicatively coupled to the switching pulse. The control circuit 125 is configured to generate a control signal on line 130 in response to the switching pulse. This control signal is used to operate the second circuit 102 as described below. The second circuit 102 includes at least one trigger cell buffer 135 that is configured to receive the control signal and to control the ESD discharge device 120 (second ESD discharge device) such that the current generated by the ESD pulse 108 is transferred to the ground rail 104.

According to various embodiments, selective placing of the first circuit 100 and the second circuit 102 into an integrated circuit I/O ring achieves selective ESD protection levels ensuring efficient use of layout area which are illustrated in FIGS. 4 and 5 respectively. A circuit implementation of the first circuit 100 and second circuit 102 is further illustrated in FIGS. 2 and 3.

Figure 2:
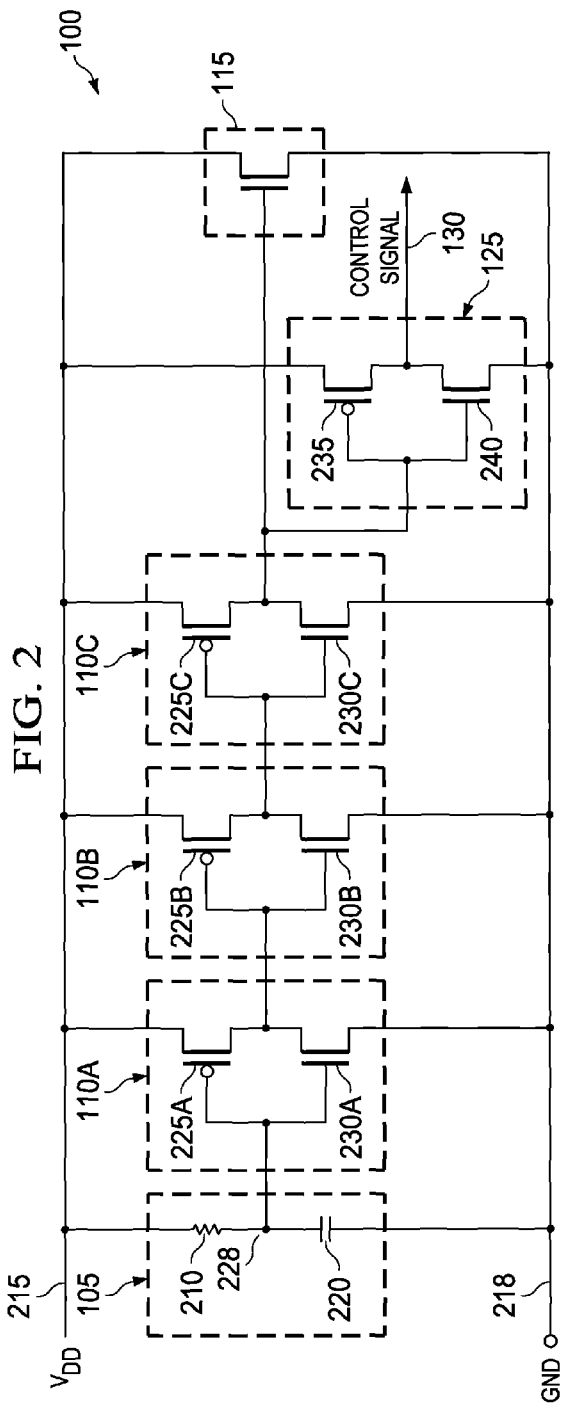
FIG. 2 is a circuit diagram of an ESD protection apparatus having a trigger circuit and a control circuit according to an embodiment.

Referring now to FIG. 2, in some embodiments, an ESD trigger circuit 105 includes a trigger circuit resistor 210 coupled to a VDD voltage rail 215. The ESD trigger circuit 105 also includes a trigger circuit capacitor 220 in series with the trigger circuit resistor 210 coupled to a ground rail 218. A switching pulse originates at a junction 228 of the trigger circuit resistor 210 and the trigger circuit capacitor 220 in response to the ESD pulse 108, as previously mentioned.

A time constant associated with the ESD trigger circuit 105 is selected to be long (e.g., approximately 50 ns) relative to the fast rising edge of the ESD pulse 108 (e.g., on the order of several hundred picoseconds). However, the time constant of the ESD trigger circuit 105 is short relative to the entire width of the ESD pulse 108 (e.g., approximately 500 ns). As such, the ESD trigger circuit 105 is designed to initiate a switching cascade through the protection apparatus 100 in order to cause the ESD discharge device 115 to begin dissipating energy associated with the ESD pulse 108.

In some embodiments, the ESD protection apparatus 100 (first circuit) also includes first, second, and third inverting buffers 110A, 110B, and 110C, respectively. In some implementations, each inverting buffer 110A, 110B, and 110C includes a PMOS transistor (e.g., PMOS transistors 225A, 225B, and 225C) coupled to the VDD voltage rail 215. In such implementations, each inverting buffer 110A, 110B, and 110C also includes an NMOS transistor (e.g., NMOS transistors 230A, 230B, and 230C) coupled to the ground rail 218. It is noted that NMOS transistor 230C associated with the third inverter 110C may be fabricated with a long, narrow-width channel to provide resistance characteristics as further described below. It is also noted that some embodiments may include additional or fewer inverting buffers and that each inverting buffer may be structured with additional or fewer transistors and/or other components.

The occurrence of an ESD event resulting in an ESD pulse 108 causes a large initial voltage drop across trigger circuit resistor 210. The voltage drop across trigger circuit resistor 210 forward biases PMOS transistor 225A, resulting in a positive pulse at the output of the first inverter 110A. The output of the first inverter 110A in turn forward biases NMOS transistor 230B of the second inverter 110B, resulting in a negative pulse at the output of the second inverter 110B. The latter negative pulse in turn forward biases PMOS transistor 225C. PMOS transistor 225C consequently conducts and forward biases power MOSFET transistor 115. Power MOSFET transistor 115 (first ESD discharge device) opens a low resistance, high current capacity channel through which to discharge the energy produced by the ESD pulse 108.

The apparatus 100 also includes the control circuit 125 having a PMOS transistor 235 coupled to the VDD voltage rail 215 and an NMOS transistor 240 coupled to the ground rail 218. Gates of the PMOS transistor 235 and the NMOS transistor 240 are configured to receive the switching pulse, and drains of the PMOS and NMOS transistors configured to generate the control signal on line 130. The control signal on line 130 is configured to be generated from a junction of the drains of the PMOS and the NMOS transistor. The output of the inverter 110C forward biases the NMOS transistor 240 and generates the control signal on line 130. In other words, the control signal 130 is pulled low in case of an ESD strike. The control signal on line 130 is used to control the second circuit 102 of which a circuit implementation is illustrated in FIG. 3.

Figure 3:
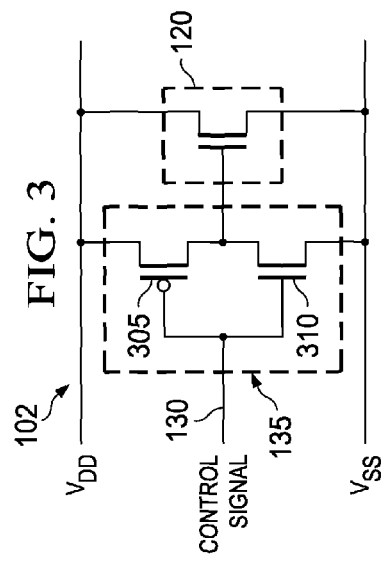
FIG. 3 is a circuit diagram of an ESD protection apparatus controlled by the control signal according to an embodiment.

Referring now to FIG. 3, the second circuit 102 includes at least one trigger cell buffer 135 that is configured to receive the control signal on line 130 and to control a second ESD discharge device 120 such that the current generated by the ESD pulse 108 is transferred to the ground. The trigger cell buffer 135 is an inverting buffer that is triggered by the control signal on line 130 that is generated in an event of an ESD strike. As noted before, the second ESD discharge device 120, like the first ESD discharge device 115, includes a metal oxide semiconductor (MOS) power transistor having a current channel with a width sufficient to transfer the current generated by the ESD pulse to the ground. It is also noted that the current channel width of the first ESD discharge device 115 is different from that of the second ESD discharge device 120 because, the current transfer requirement is different for both discharge devices 115 and 120.

The trigger cell buffer 135 includes a PMOS transistor 305 coupled to an NMOS transistor 310. Source of the PMOS transistor 305 is coupled to the VDD voltage rail and source of the NMOS transistor 310 is coupled to the ground rail. Drains of the transistors 305 and 310 are coupled and a signal is generated from the junction of drains. This signal drives the gate of a power MOSFET 120 (second ESD discharge device implemented as a power MOSFET). The drain of the NMOS transistor 120 is coupled to the VDD voltage rail and source is coupled to the ground rail. Operationally, as mentioned earlier, the control signal 130 is pulled low (generated from the control circuit 125). The negative pulse in turn forward biases PMOS transistor 305. PMOS transistor 305 consequently conducts and forward biases power MOSFET transistor 120. Power MOSFET transistor 120 opens a low resistance, high current capacity channel through which the energy produced by the ESD pulse 108 is discharged.

According to various embodiments, selective placing of the first circuit 100 and the second circuit 102 into an integrated circuit I/O ring achieves selective ESD protection levels ensuring efficient use of layout area. A 2KV HBM (human body model) and 1KV HBM protection level are illustrated respectively in FIGS. 4 and 5 to illustrate ways of achieving various levels of ESD protection using the first circuit 100 and the second circuit 102.

Referring now to FIG. 4, a 2KV HBM ESD protection level is illustrated. A ring of input/output (I/O) cells 405 are coupled between a VDD voltage rail 410 and a Vss ground rail 420. One first circuit 100 is strategically placed between the VDD voltage rail 410 and the Vss ground rail 420. Two second circuits 102 are also placed between the VDD voltage rail 410 and the Vss ground rail 420 in the I/O ring. The control signal is generated from the first circuit 100 on a control signal rail 415 and the second circuits 102 are coupled to the control signal rail 415. The first circuit 100 and second circuit 102 are similar to that of FIGS. 1, 2 and 3 respectively in both connection and operation. It is noted that for circuits with lower ESD targets, more I/O slots are available since the additional second circuit 102 placement is not needed (as shown in FIG. 5).

Referring now to FIG. 5, a 1KV HBM ESD protection level is illustrated. A ring of input/output (I/O) cells 505 are coupled between a VDD voltage rail 510 and a Vss ground rail 520. One first circuit 100 is strategically placed between the VDD voltage rail 510 and the Vss ground rail 520. One second circuit 102 is also placed between the VDD voltage rail 510 and the Vss ground rail 520 in the I/O ring. The control signal is generated from the first circuit 100 on a control signal rail 515 and the second circuit 102 is coupled to the control signal rail 515. The first circuit 100 and second circuit 102 are similar to that of FIGS. 1, 2 and 3 respectively in both connection and operation.

From the FIGS. 4 and 5, it is clear that a single placement of the first circuit and a single or multiple placements of the second circuit set the level of ESD protection provided by the ESD network. Accordingly, various embodiments provide reduced layout area, modularity of cell placements, and reduced number of needed ESD cells in the IC layout.

It is noted that the ESD protection apparatus according to various embodiments can be employed in a variety of electronic devices such as microprocessors, application specific integrated circuits (ASICs), microcontrollers, and systems on chip (SoC). Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

While all the circuit implementations described herein are illustrated using MOS transistors such as silicon substrate and silicon on insulator MOSFETs, other types of transistors such as bipolar junction transistors, multiple independent gate FET (MIGFETs) and other materials such as silicon germanium can be implemented as appropriate without departing from the scope of the present disclosure. In addition, although the ESD discharge devices are illustrated herein as n-channel MOSFETs, two or more series n-channel or p-channel MOSFETs, a bipolar junction transistor, or semiconductor controlled rectifiers (SCR) can be used without departing from the scope of the present disclosure. The term I/O used herein refers to input/output or a combination thereof. Accordingly, the term 'I/O' as here used herein refers to any of an input-only cell, an output only cell or a cell configurable as both an input cell and an output cell.

In the foregoing discussion, the terms "connected" means at least either a direct electrical connection between the devices connected or an indirect connection through one or more passive intermediary devices. The term "circuit" means at least either a single component or a multiplicity of passive components, that are connected together to provide a desired function. The term "signal" means at least one current, voltage, charge, data, or other signal.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. An electrostatic discharge (ESD)-triggered protection apparatus, comprising:
    a first circuit comprising:
        an ESD trigger circuit to sense an ESD pulse and to generate a switching pulse responsive to the ESD pulse;
        a first ESD discharge device communicatively coupled to the ESD trigger circuit and responsive to the switching pulse to transfer a current generated by the ESD pulse to a ground rail;
        a control circuit that generates a control signal in response to the switching pulse;
        at least one inverting buffer communicatively coupled between the ESD trigger circuit and the first ESD discharge device to propagate the switching pulse from the ESD trigger circuit to the first ESD discharge device, wherein the at least one inverting buffer further includes first, second, and third inverters, each inverter comprising a PMOS transistor coupled to a VDD voltage rail and an NMOS transistor coupled to the ground rail, the NMOS transistor associated with the third inverter having a long, narrow-width channel to provide resistance characteristics; and
    a second circuit comprising:
        at least one trigger cell buffer that is configured to receive the control signal and to control a second ESD discharge device such that the current generated by the ESD pulse is transferred to the ground rail.

2. The ESD-triggered protection apparatus of claim 1, wherein a single placement of the first circuit and a single or multiple placements of the second circuit provides selectable levels of ESD protection.

3. The ESD-triggered protection apparatus of claim 1, the ESD trigger circuit further comprises:
    a trigger circuit resistor coupled to a VDD voltage rail; and
    a trigger circuit capacitor in series with the trigger circuit resistor coupled to the ground rail, the switching pulse to originate at a junction of the trigger circuit resistor and the trigger circuit capacitor responsive to the ESD pulse.

4. The ESD-triggered protection apparatus of claim 1, wherein the first ESD discharge device and the second ESD discharge device comprises:
    a metal oxide semiconductor (MOS) power transistor having a current channel width sufficient to transfer the current generated by the ESD pulse to the ground rail.

5. The ESD-triggered protection apparatus of claim 1, wherein the control circuit comprises:
  a PMOS transistor coupled to the VDD voltage rail and an NMOS transistor coupled to the ground rail, gates of the PMOS transistor and the NMOS transistor configured to receive the switching pulse, and drains of the PMOS and NMOS transistors configured to generate the control signal.

6. The ESD-triggered protection apparatus of claim 1, wherein the switching pulse is configured to pull a gate of the MOS power transistor such that the MOS power transistor turns ON to transfer the current generated by the ESD pulse to the ground rail.

7. An ESD-triggered protection apparatus in an integrated circuit comprising:
  a ring of input/output (I/O) cells;
  a first circuit comprising:
  an ESD trigger circuit to sense an ESD pulse and to generate a switching pulse responsive to the ESD pulse;
  a first ESD discharge device communicatively coupled to the ESD trigger circuit and responsive to the switching pulse to transfer a current generated by the ESD pulse to a ground rail;
  a control circuit that generates a control signal in response to the switching pulse; and
  at least one of a second circuit comprising:
  at least one trigger cell buffer that is configured to receive the control signal and to control a second ESD discharge device such that the current generated by the ESD pulse is transferred to the ground rail, wherein the first ESD discharge device and the second ESD discharge device comprises a metal oxide semiconductor (MOS) power transistor having a current channel with a width sufficient to transfer the current generated by the ESD pulse to the ground rail, and wherein the current channel width of the first ESD discharge device is different from that of the second ESD discharge device.

8. The ESD-triggered protection apparatus of claim 7, wherein the first circuit further comprises:
  at least one inverting buffer communicatively coupled between the ESD trigger circuit and the ESD discharge device to propagate the switching pulse from the ESD trigger circuit to the ESD discharge device.

9. The ESD-triggered protection apparatus of claim 8, wherein the at least one inverting buffer further comprises:
  first, second, and third inverters, each inverter comprising a PMOS transistor coupled to a VDD voltage rail and an NMOS transistor coupled to the ground rail, the NMOS transistor associated with the third inverter having a long, narrow-width channel to provide resistance characteristics.

10. The ESD-triggered protection apparatus of claim 7, the ESD trigger circuit further comprising:
  a trigger circuit resistor coupled to a VDD voltage rail; and
  a trigger circuit capacitor in series with the trigger circuit resistor to a the ground rail, the switching pulse to originate at a junction of the trigger circuit resistor and the trigger circuit capacitor responsive to the ESD pulse.

11. The ESD-triggered protection apparatus of claim 7, wherein the control circuit comprises:
  a PMOS transistor coupled to the VDD voltage rail and an NMOS transistor coupled to the ground rail, gates of the PMOS transistor and the NMOS transistor configured to receive the switching pulse, wherein the control signal is configured to be generated from a junction of drains of the PMOS and the NMOS transistor.

12. An electrostatic discharge (ESD)-triggered protection apparatus, comprising:
  an ESD trigger circuit to sense an ESD pulse and to generate a switching pulse responsive to the ESD pulse;
  a first ESD discharge device communicatively coupled to the ESD trigger circuit and responsive to the switching pulse to transfer a current generated by the ESD pulse to a ground rail;
  at least one inverting buffer communicatively coupled between the ESD trigger circuit and the ESD discharge device to propagate the switching pulse from the ESD trigger circuit to the ESD discharge device;
  a control circuit that generates a control signal in response to the switching pulse; and
  a second ESD discharge device communicatively coupled to the control circuit and responsive to the control signal to transfer the current generated by the ESD pulse to the ground rail, wherein the current channel width of the first ESD discharge device is different from that of the second ESD discharge device.

13. The electrostatic discharge (ESD)-triggered protection apparatus of claim 12 further comprising a buffer coupled between the control circuit and the second ESD discharge circuit to propagate the switching pulse from the ESD trigger circuit to the second ESD discharge device.

14. The ESD-triggered protection apparatus of claim 12, wherein the ESD trigger circuit comprises:
  a trigger circuit resistor coupled to a VDD voltage rail; and
  a trigger circuit capacitor in series with the trigger circuit resistor to the ground rail, the switching pulse to originate at a junction of the trigger circuit resistor and the trigger circuit capacitor responsive to the ESD pulse.

15. The ESD-triggered protection apparatus of claim 12, wherein the first ESD discharge device and the second ESD discharge device comprises:
  a metal oxide semiconductor (MOS) power transistor having a current channel width sufficient to transfer the current generated by the ESD pulse to the ground rail.

16. The ESD-triggered protection apparatus of claim 12, wherein the control circuit comprises:
  a PMOS transistor coupled to the VDD voltage rail and an NMOS transistor coupled to the ground rail, gates of the PMOS transistor and the NMOS transistor configured to receive the switching pulse, wherein the control signal is generated from a junction between drains of the PMOS and NMOS transistor.

* * * * *